(12) United States Patent
DiVito et al.

(10) Patent No.: US 9,787,101 B2
(45) Date of Patent: Oct. 10, 2017

(54) BIDIRECTIONAL CONVERSION ARCHITECTURE WITH ENERGY STORAGE

(71) Applicant: HONEYWELL INTERNATIONAL INC., Morristown, NJ (US)

(72) Inventors: Rocco DiVito, Ontario (CA); Hassan Ali Kojori, Ontario (CA); Nicolae Morcov, Ontario (CA); Wayne Pearson, Oro Valley, AZ (US); Cristian Anghel, Oro Valley, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 472 days.

(21) Appl. No.: 14/480,820

(22) Filed: Sep. 9, 2014

(65) Prior Publication Data

US 2016/0070266 A1    Mar. 10, 2016

(51) Int. Cl.
*H02J 4/00* (2006.01)
*B60L 7/16* (2006.01)
(Continued)

(52) U.S. Cl.
CPC ...... *H02J 4/00* (2013.01); *B60L 7/10* (2013.01); *B60L 7/16* (2013.01); *B64C 25/405* (2013.01);
(Continued)

(58) Field of Classification Search
CPC .... B64C 25/405; B64C 25/42; G05D 1/0083; G05D 1/0202; Y02T 50/823; Y02T 10/62; H02P 3/14; B60L 7/16; B60L 7/10; B60T 8/325; H02J 1/00; H02J 7/0055; H02J 2007/0059; H02J 7/14
See application file for complete search history.

(56) References Cited

U.S. PATENT DOCUMENTS

| 5,898,282 A | 4/1999 | Drozdz et al. |
| 7,226,018 B2 * | 6/2007 | Sullivan ............ B60L 7/26 244/111 |

(Continued)

OTHER PUBLICATIONS

Bidirectional DC-DC Power Converter Design Optimization, Modeling and Control by Junhong Zhang Dissertation submitted to the faculty of the Virginia Polytechnic Institute and State University in partial fulfillment of the requirements for the degree of Doctor of Philosophy in Electrical Engineering , Jan. 30, 2008.
Power Management for the Electric Taxiing System Incorporating the More Electric Architecture Saturday, Feb. 1, 2014 IHI Corporation/IHI Aerospace, Tokyo, Japan.

*Primary Examiner* — Ryan Johnson
(74) *Attorney, Agent, or Firm* — Shimokaji IP

(57) ABSTRACT

An electrical system for an aircraft with an electric taxi system (ETS), the electrical system may include at least one traction motor, a DC link and at least one traction-motor bidirectional DC-AC converter interposed between the at least one traction motor and the DC link. An engine-driven power source may be configured to provide DC power to the DC link or extract DC power from the DC link. A battery unit may be configured to provide DC power to the DC link or extract DC power from the DC link. An adaptive power controller may be interconnected with the power source, the battery unit and the at least one traction-motor bidirectional DC-AC converter and configured to regulate voltage of DC power delivered to the DC link.

17 Claims, 8 Drawing Sheets

(51) Int. Cl.
*B64C 25/40* (2006.01)
*B64C 25/42* (2006.01)
*H02J 7/00* (2006.01)
*H02P 3/14* (2006.01)
*H02J 1/00* (2006.01)
*H02J 7/14* (2006.01)
*H02J 7/34* (2006.01)
*B60L 7/10* (2006.01)

(52) U.S. Cl.
CPC ............... *B64C 25/42* (2013.01); *H02J 1/00* (2013.01); *H02J 7/0055* (2013.01); *H02J 7/14* (2013.01); *H02J 7/345* (2013.01); *H02P 3/14* (2013.01); *B64D 2221/00* (2013.01); *H02J 2007/0059* (2013.01); *Y02T 50/823* (2013.01)

(56) References Cited

U.S. PATENT DOCUMENTS

| | | | |
|---|---|---|---|
| 7,304,404 B2* | 12/2007 | Aridome | B60L 3/0046 307/10.1 |
| 7,445,178 B2* | 11/2008 | McCoskey | B64F 1/32 244/100 R |
| 8,123,163 B2 | 2/2012 | McCoskey et al. | |
| 8,395,335 B2 | 3/2013 | Marchand et al. | |
| 2010/0280694 A1* | 11/2010 | Noiret | B60L 7/16 701/22 |
| 2013/0087654 A1 | 4/2013 | Seibt | |
| 2013/0229053 A1 | 9/2013 | Rambaud et al. | |

* cited by examiner

BIDIRECTIONAL CONVERSION ARCHITECTURE WITH ENERGY STORAGE

BACKGROUND OF THE INVENTION

The present invention relates to aircraft electrical systems and, more particularly, to electrical systems on aircraft that employ electric taxi systems.

In a typical aircraft employing an electric taxi system (ETS), landing gear wheels are driven by electric motors which are provided with electrical power produced by an on-board auxiliary power unit (APU). In order to fully realize the economic benefits of employing an ETS, main engines of an aircraft are not operated during ground-based movement. Consequently the APU is tasked with providing not only electrical power for the ETS motors but also air conditioning power and power for a full array of electrical loads of the aircraft. Thus an aircraft equipped with ETS may need to be fitted with a non-conventional high capacity APU.

Aircraft without ETS are pushed back from a gate with a tug. During tug push-back the tug controls the aircraft movement, including braking, so the crew do not use the brakes. It would be desirable to provide for push-back using ETS with a similar absence of need to use the brakes.

When the aircraft moves faster than the wheel actuator motors are being driven, the motors may become generators and push current back toward the power source. During ETS pushback, existing ETS may disengage wheels from drive motors with a wheel actuator clutch. Alternatively, regenerated power may be dissipated locally in power resistors. Frequent operation of the clutch is undesirable from a life and reliability perspective. Dissipating regenerated power into resistors is inefficient, generates heat which must be managed, and adds significant weight and volume to the system.

As can be seen, there is a need for an electrical system in which an ETS that may be powered with an APU having conventional output capacity. Additionally there is a need for such a system that accommodates regenerative braking and effectively utilizes electrical energy produced during such braking.

SUMMARY OF THE INVENTION

In one aspect of the present invention, an electrical system for an aircraft with an electric taxi system (ETS), the electrical system may comprise: at least one traction motor; a DC link; at least one traction-motor bidirectional DC-AC converter interposed between the at least one traction motor and the DC link; an engine-driven power source configured to provide DC power to the DC link or extract DC power from the DC link; a battery unit configured to provide DC power to the DC link or extract DC power from the DC link; and an adaptive power controller interconnected with the power source, the battery unit and the at least one traction-motor bidirectional DC-AC converter and configured to regulate voltage of DC power delivered to the DC link.

In another aspect of the present invention, a battery-based power system for traction motors of an electric taxi system (ETS) of an aircraft may comprise: a battery unit coupled with a DC link; a traction-motor bidirectional DC-AC converter interposed between the DC link and a traction motor of the ETS; and an adaptive power controller configured to control DC power flow from the battery unit to the traction motor when the ETS is in a driving mode and to control DC power flow from the traction motor to the battery unit when the ETS is in a braking mode, the traction-motor bidirectional DC-AC converter being configured to regulate output voltage of DC power produced during braking mode operation of the ETS so that said output voltage is high enough to produce charging of the battery unit.

In still another aspect of the present invention, a method for controlling power flow in an electric taxi system (ETS) of an aircraft may comprise the steps of: determining if traction motor is driving or braking; determining that state of charge (SOC) of a battery unit is above a predetermined minimum when the traction motor is driving; and utilizing power from the battery unit to augment power from an engine-driven power source to drive the traction motor when the SOC is above the predetermined minimum.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

The present invention generally provides an aircraft electrical system that employs an energy storage device as an adjunct source of electrical power for an electric taxi system (ETS). More particularly, the present invention provides for a system in which energy produced by regenerative braking is effectively utilized to, among other things, power ancillary electrical loads or reduces mechanical loads on the APU.

Figure 1:
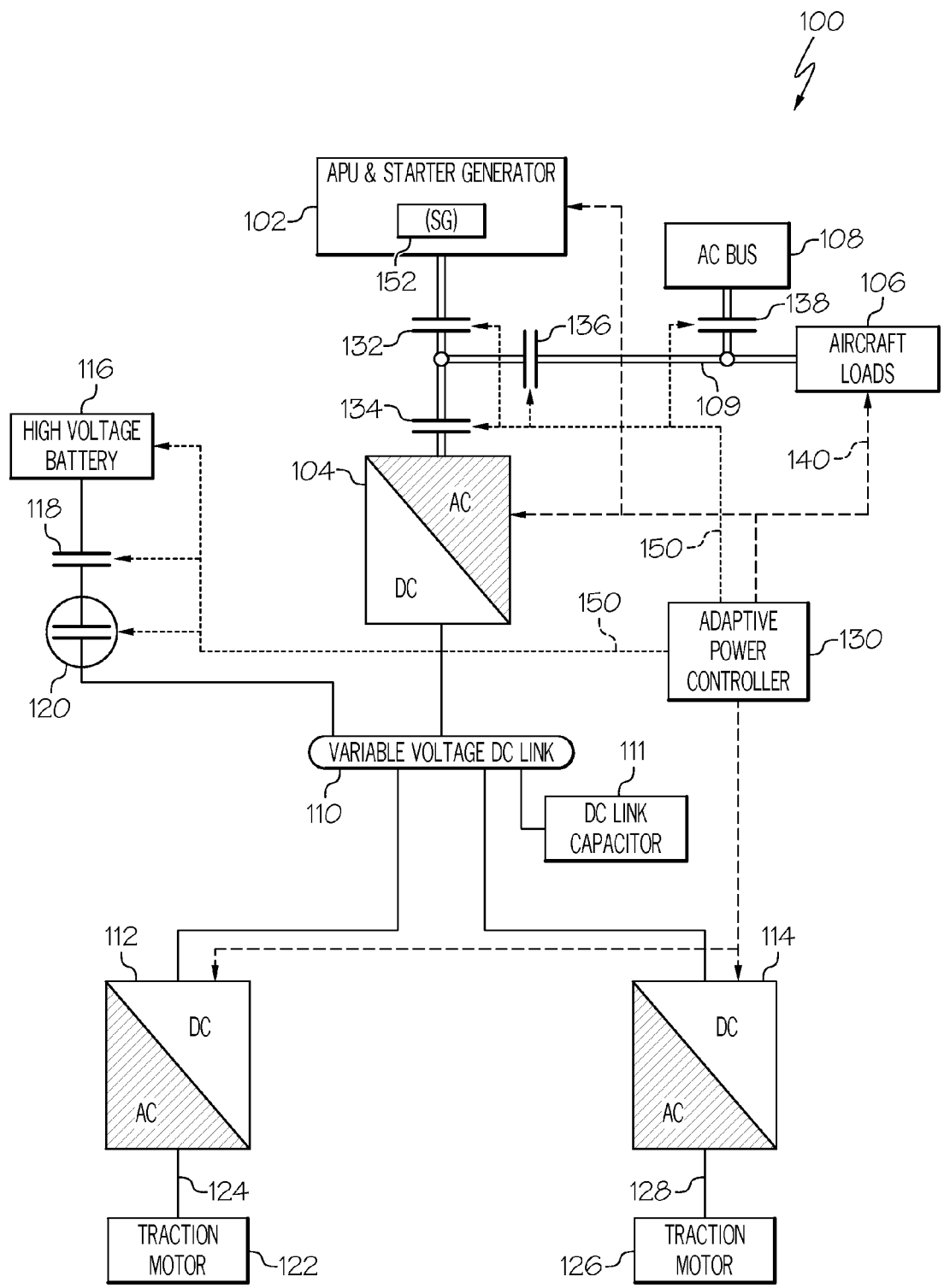
FIG. 1 is a schematic diagram of an electrical system for an aircraft with an electric taxi system in accordance with an embodiment of the invention.

Turning now to the description and with reference first to FIG. 1, a schematic diagram may illustrate an electrical system 100 that may be employed in an aircraft equipped with an electric taxi system (not shown). An auxiliary power unit (APU) 102 may be connected to deliver and/or receive electrical power from a power-source bidirectional AC-DC converter (BC) 104, various aircraft loads 106 and an AC bus 108 through an AC power feeder 109. A variable voltage DC link 110 may be connected directly with a DC link capacitor 111, the BC 104, a traction-motor bidirectional AC-DC converter (BC) 112 and a traction-motor bidirectional AC-DC converter (BC) 114. The DC link 110 may be connectable to a high voltage battery unit 116 through a contactor 118 and a solid state switch 120. The BC 112 may be connected with a traction motor 122 through an AC power feeder 124. The BC 114 may be connected with a traction motor 126 through an AC power feeder 128.

An adaptive power controller 130 may be interconnected with the aircraft loads 106, the BC 104, the BC 112, the BC 114 and the APU 102 through master/slave inter-controller control signals 140. The controller 130 may be interconnected with the switch 120 and with contactors 118, 132, 134, 136 and 138 through contactor/battery unit control signals 150.

The system 100 may operate in various modes. For example, the system may operate in: a) a battery unit charging mode; b) a power assist mode; c) an energy recovery mode with energy to battery unit and aircraft loads; d) an energy recovery mode with energy to APU; or d) an emergency power delivery mode. These exemplary modes of operation are described below with references to various Figures.

Figure 2:
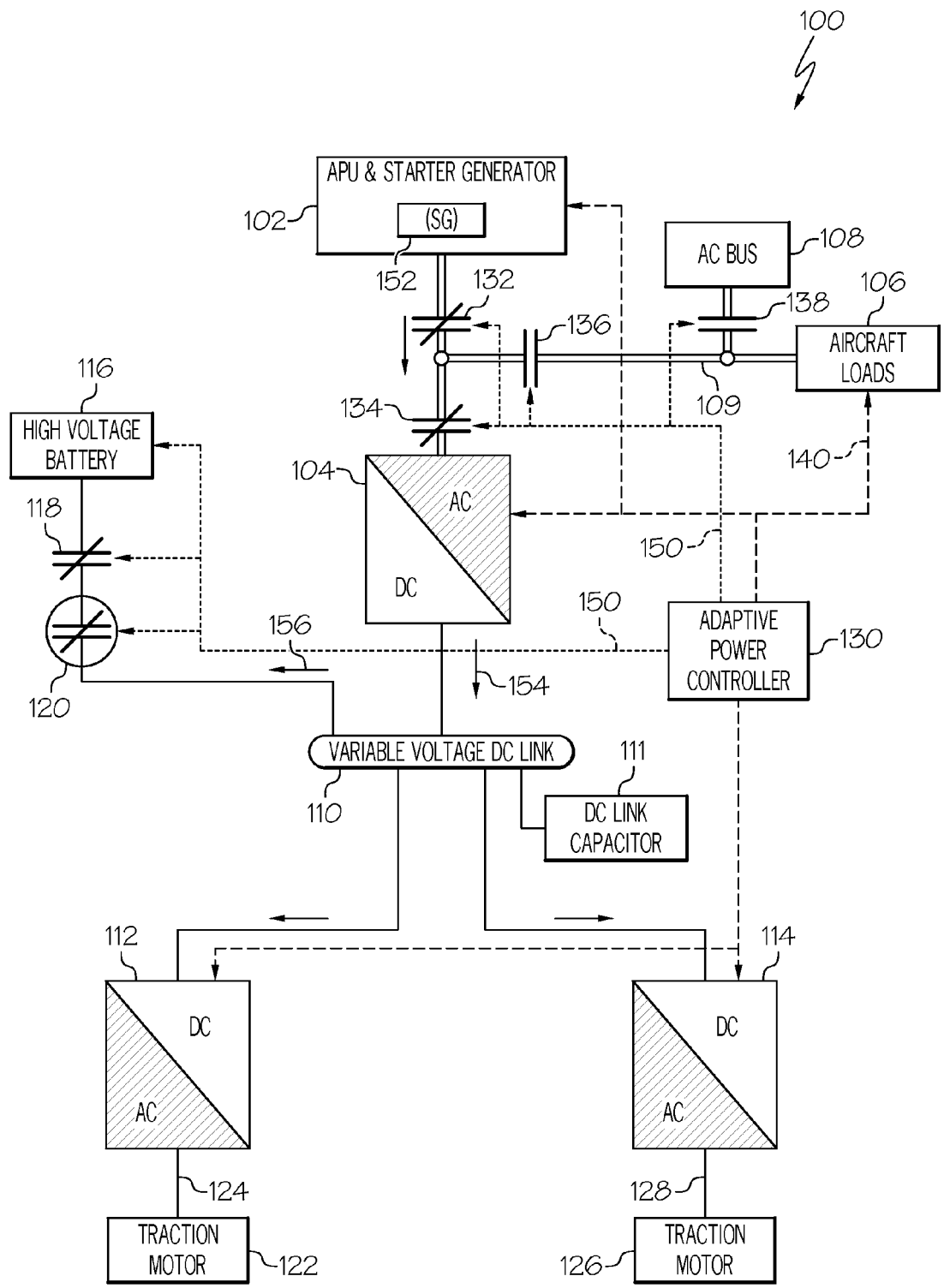
FIG. 2 is a schematic diagram of an operational mode of the system of FIG. 1 in accordance with an exemplary embodiment of the invention.

Referring now to FIG. 2, a power flow diagram may illustrate operation of the system 100 in an exemplary battery unit charging mode. This battery unit charging mode may occur, for example, when an aircraft is taxiing and the traction motors 122 and 126 are drawing power at a rate that is less than the power generating capacity of the APU 102. The contactors 132 and 134 may be closed so that AC power flows to the BC 104 from a starter generator (SG) 152 of the APU 102. DC power may flow from the BC 104 to the DC link 110. From the DC link 110, a first portion 154 of the DC power delivered to the DC link 110 may flow to the BC 112 and the BC 114. Within the BC 112 and the BC 114, the first portion 154 of DC power may be converted to AC power and may be used to drive the traction motor 122 and 126. A remaining portion 156 of the DC power form the DC link 110 may pass through the solid state switch 120 and the contactor 118 and into the battery unit 116. The adaptive power controller 130 may collect battery unit charging data from the battery unit 116 and, in response to such data, the controller 130 may provide control signaling to the SG 152 of the APU 102 to assure that the portion 156 of DC power delivered to the battery unit 116 does not result in excessive charging of the battery unit 116.

Figure 3:
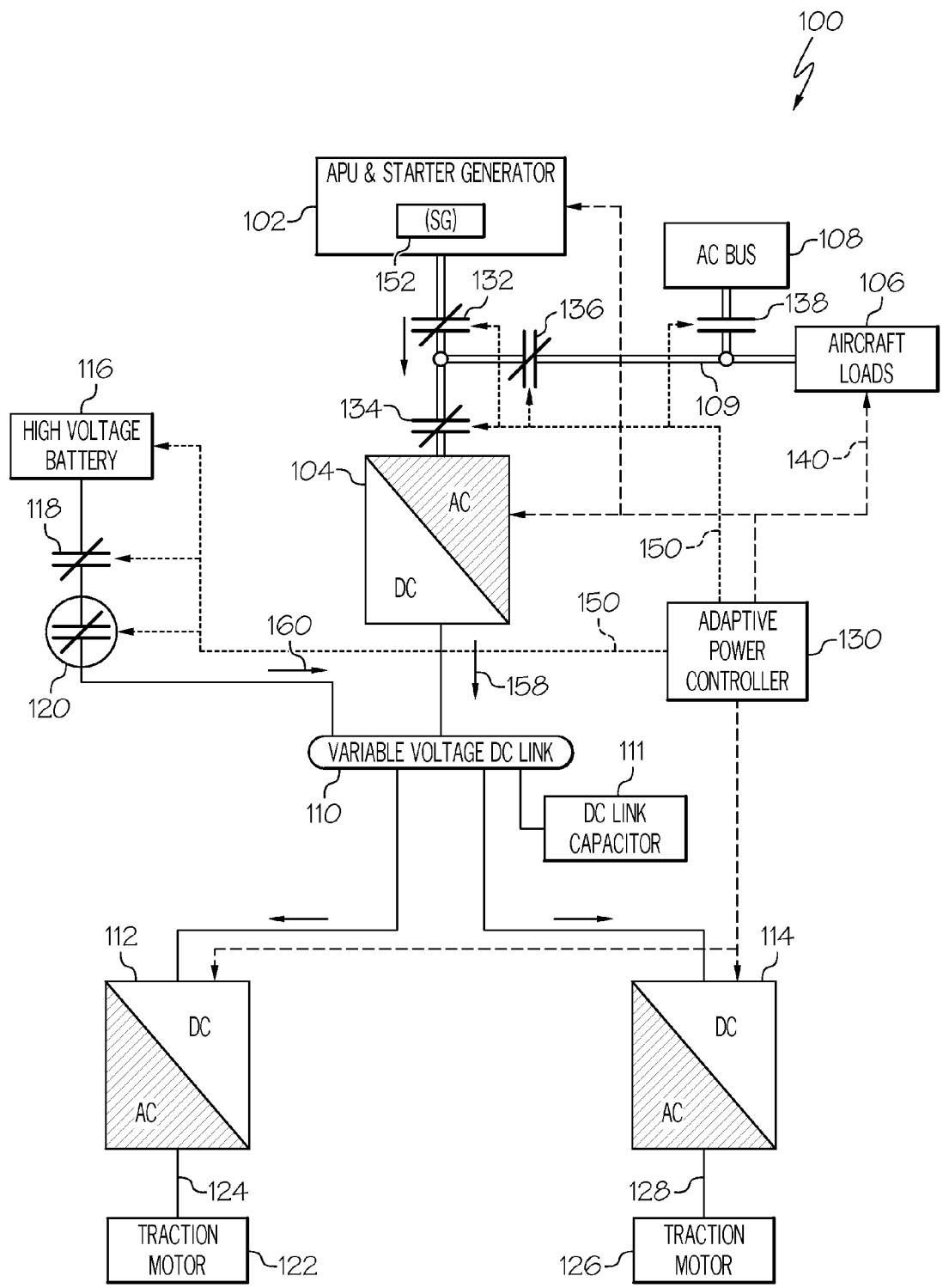
FIG. 3 is a schematic diagram of a second operational mode of the system of FIG. 1 in accordance with an exemplary embodiment of the invention.

Referring now to FIG. 3, a power flow diagram illustrates an exemplary mode of operation of the system 100 in which the battery unit 116 provides power assist for driving the traction motors 122 and 126. This power assist mode may occur, for example, when an aircraft is taxiing and the traction motors 122 and 126 are drawing power at a rate that is more than the power generating capacity of the APU 102. The contactors 132 and 134 may be closed so that AC power may flow to the BC 104 from the starter generator 152 of the APU 102. A portion 158 of DC power may flow from the BC 104 to the DC link 110. A portion 160 of DC power may flow from the battery unit 116 to the DC link 110. From the DC link 110, combined portions 158 and 160 of the DC power may flow to the BC 112 and the BC 114. Within the BC 112 and the BC 114, said DC power may be converted to AC power which may be used to drive the traction motors 122 and 126. The adaptive power controller 130 may collect battery unit charge data from the battery unit 116 and in response to such data the controller 130 may provide control signaling to the BC 112 and BC 114 to assure that the portion 160 of DC power delivered from the battery unit 116 does not result in excessive discharging of the battery unit 116.

Figure 4:
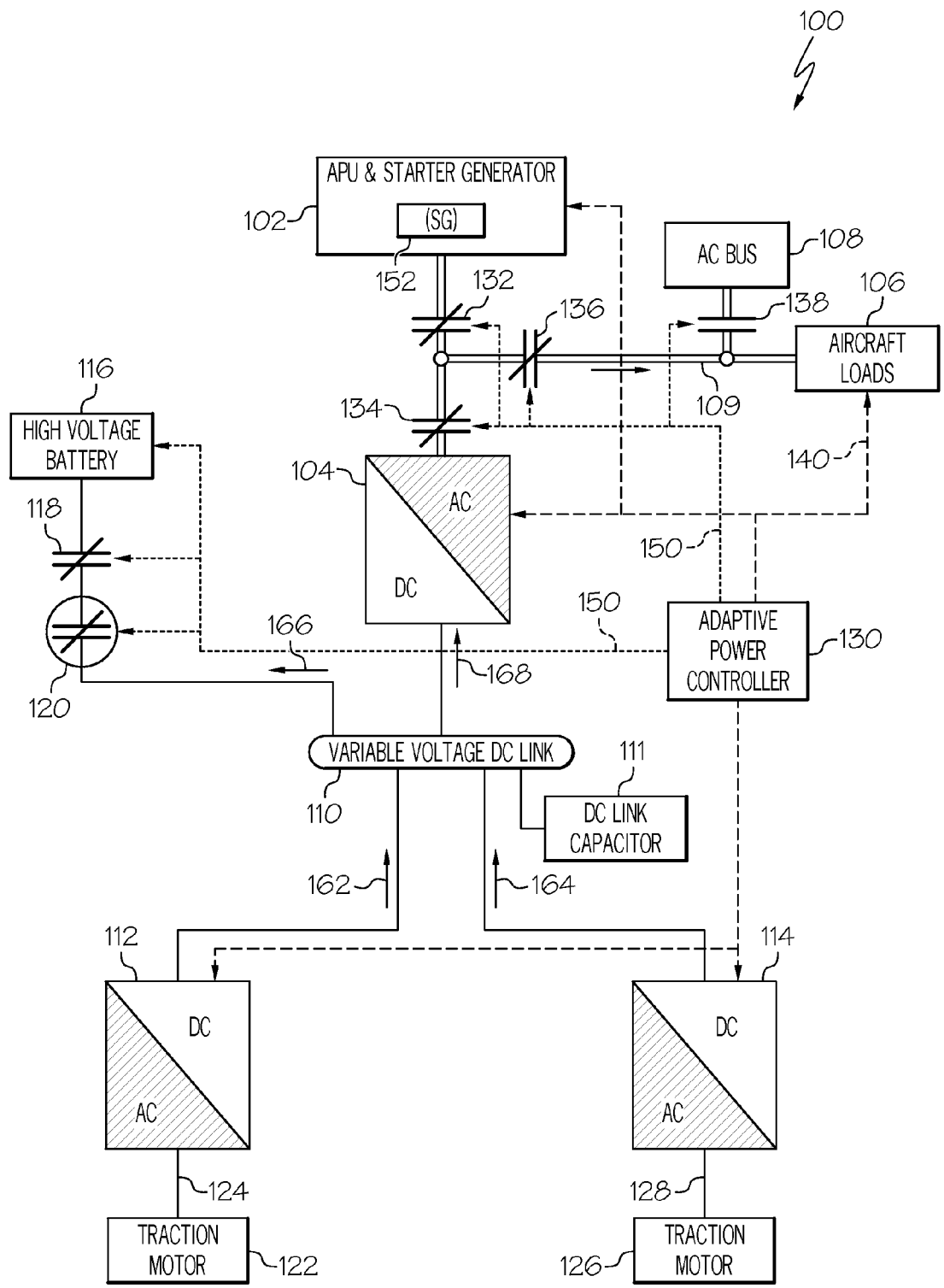
FIG. 4 is a schematic diagram of a third operational mode of the system of FIG. 1 in accordance with an exemplary embodiment of the invention.

Referring now to FIG. 4, a power flow diagram illustrates an exemplary mode of operation of the system 100 in which the traction motors 122 and 126 may function as generators during taxiing procedures in which an aircraft is reducing its taxiing speed, e.g., regenerative braking. In the exemplary regeneration mode shown in FIG. 4, energy from the traction motors 122 and 126 may be delivered to aircraft loads 106 and employed to provide charging of the battery unit 116.

The traction motors 122 and 126 may provide AC power to the BC 112 and BC 114. The BCs 112 and 114 may convert such AC power to regulated DC power 162 and 164 and deliver the regulated DC power 162 and 164 to the DC link. In some instances, the aircraft may be moving slowly when the traction motors 122 and 126 begin producing AC power. Consequently, there may be times when the AC power is produced at a low voltage. The BCs 112 and 114 may provide voltage boosting such that the DC power 162 and 164 is delivered to the DC link 110 at a voltage suitable for charging the battery unit 116.

The controller 130 may receive charge data from the battery unit 116. Responsively to such data, the solid state switch 120 may be operated to control an amount of DC power 166 that may be transmitted to the battery unit 116 from the DC link 110. If the DC power 162 and 164 exceed the DC power 166, then a remaining portion of DC power 168 may pass into the BC 104. The BC 104 may convert the DC power 168 to AC power for delivery to the aircraft loads 106.

Figure 5:
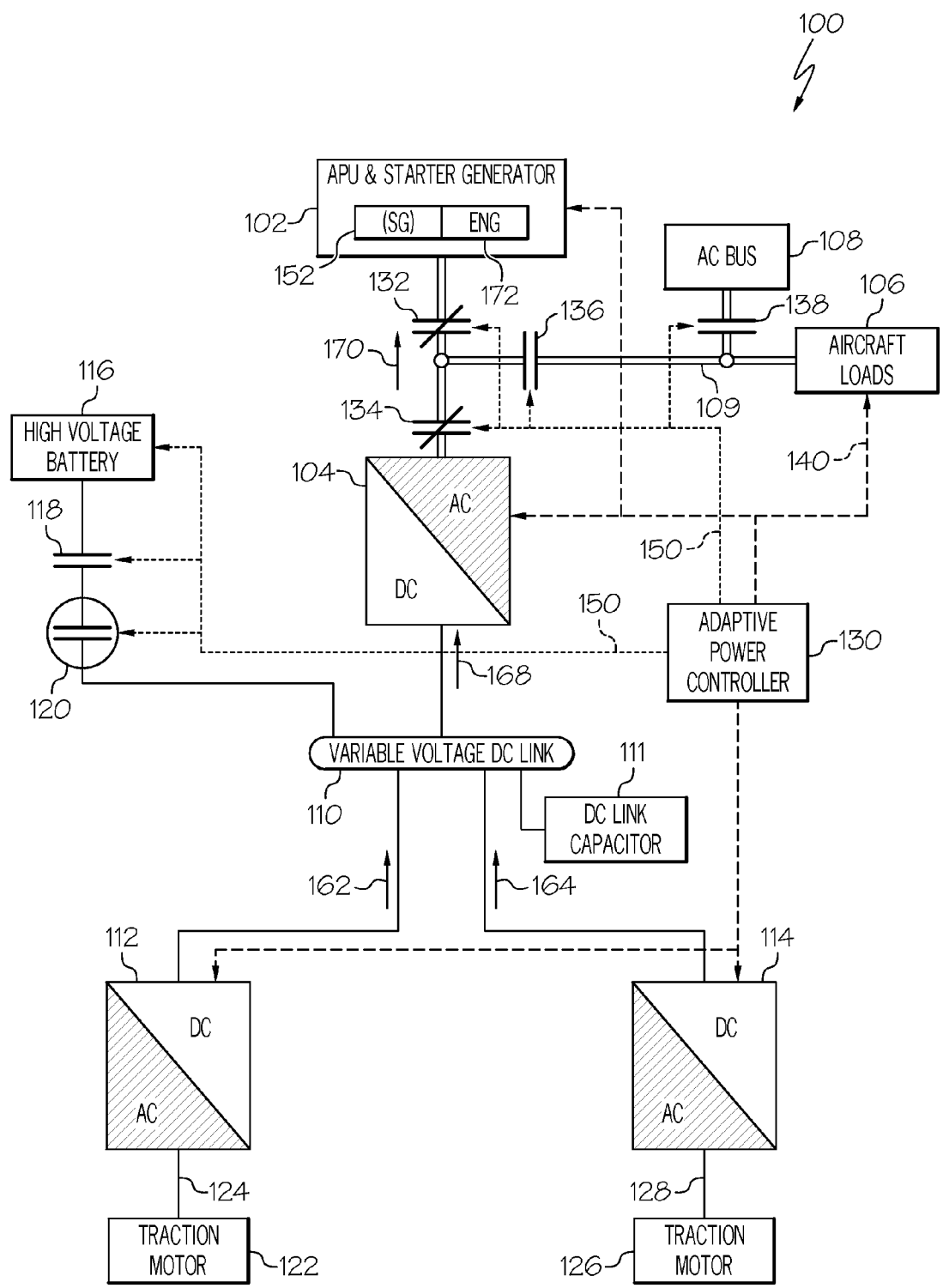
FIG. 5 is a schematic diagram of a fourth operational mode of the system of FIG. 1 in accordance with an exemplary embodiment of the invention.

Referring now to FIG. 5, a power flow diagram illustrates an exemplary mode of operation of the system 100 in which the traction motors 122 and 126 may function as generators during taxiing procedures in which an aircraft is reducing its taxiing speed. In the mode illustrated in FIG. 5, the battery unit 116 may be fully charged. In this mode, all of the DC power 162 and 164 reaching the DC link 110 may be transferred, as the DC power 168, to the BC 104. The BC 104 may convert the DC power 168 into AC power 170 to be delivered to the SG 152 of the APU 102. In that case, the SG 152 may be back driven to reduce mechanical loading of an engine 172 of the APU 102.

Figure 6:
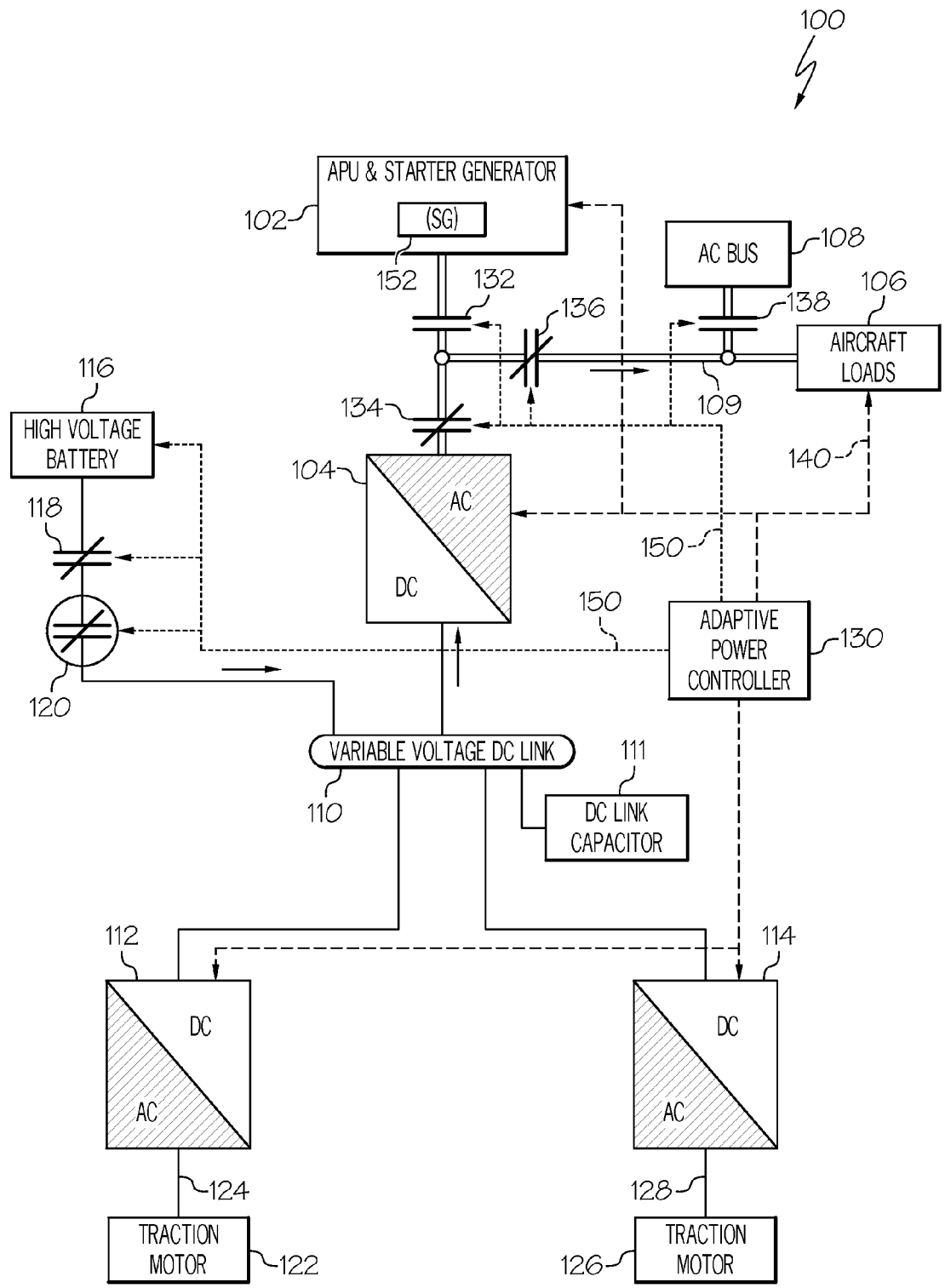
FIG. 6 is a schematic diagram of a fifth operational mode of the system of FIG. 1 in accordance with an exemplary embodiment of the invention.

Referring now to FIG. 6, a power flow diagram illustrates an exemplary mode of operation of the system 100 in which the battery unit 116 may supply emergency power to the aircraft loads 106. In this emergency power mode, DC power 174 from the battery unit 116 may enter the BC 104 through the DC link 100. The BC 104 may convert such DC power into AC power 176 for delivery to the AC aircraft loads 106. Through employment of the system 100 with such emergency power capability, an aircraft may be constructed without a need for previously used emergency power devices such as ram air generators and/or distributed low voltage batteries.

Figure 7:
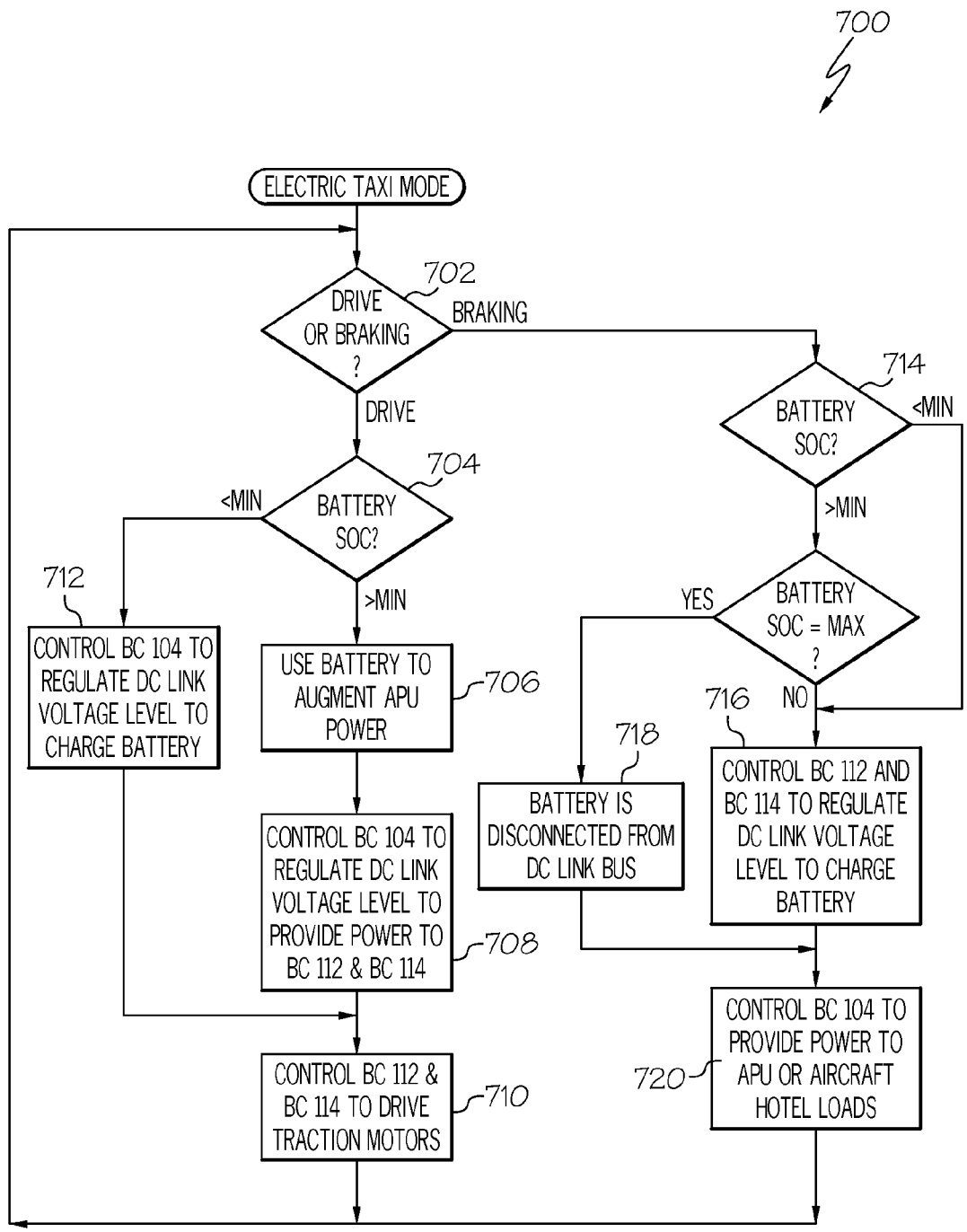
FIG. 7 is a flow chart of a method for controlling power flow in an electric taxi system (ETS) of an aircraft in accordance with an embodiment of the invention.

Referring now to FIG. 7, a diagram illustrates an exemplary method 700 for using the adaptive power controller 130 of FIG. 1 when the aircraft is in an electric taxi mode. At step 702, determination is made as to whether the traction motors 122 and 126 are driving or braking. If driving is occurring, a state of charge (SOC) of the battery unit 116 may be determined at a step 704. If the SOC is greater than a predetermined minimum, a step 706 may occur in which the battery unit 116 may be used to augment power from the APU 102, as shown in FIG. 3. In a step 708, the BC 104 may regulate voltage at the DC link 110 to provide power to the BCs 112 and 114. In a step 710, the controller 130 may control the BCs 112 and 114 to drive the traction motors 122 and 126. If the SOC is less than a predetermined minimum, a step 712 may be performed in which the BC 104 may regulate voltage at the DC link 100 to charge the battery unit 116.

If, at step 702, determination is made that braking is occurring, SOC of the battery unit may be determined at step 714. If the SOC is below the predetermined minimum, then in a step 716, the BCs 112 and 114 may regulate voltage at the DC link to charge the battery unit 116 as shown in FIG. 4. If the SOC is above the predetermined minimum but below the predetermined maximum then step 716 may be performed. If the SOC is at the maximum then a step 718 may be performed in which the battery unit 116 is disconnected from the DC link 110. In a step 720, the controller may direct the BC 104 to provide power to the aircraft loads 106 and/or the SG 152 of the APU 102.

Figure 8:
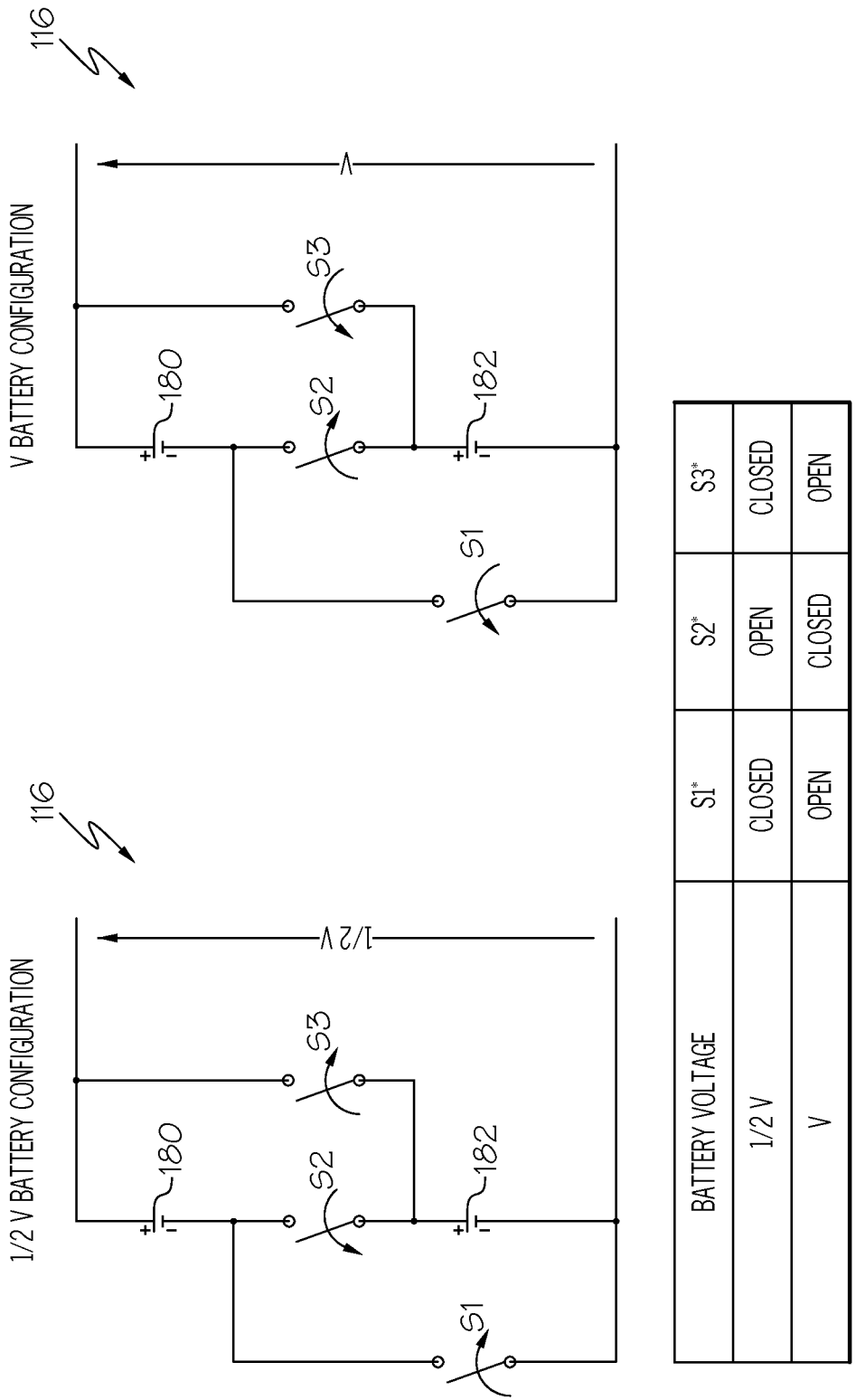
FIG. 8 is a schematic diagram of a battery unit of the system of FIG. 1 in accordance with an exemplary embodiment of the invention

Referring now to FIG. 8, a schematic diagram illustrates an exemplary embodiment of the battery unit 116. The battery unit 116 may comprise a first set of cells 180 and a second set of cells 182. The adaptive power controller 130 of FIG. 1 may control configuration of the battery unit 116 (series or parallel) depending on DC link bus voltage required to satisfy traction motor speed. For example, battery unit=½ V for speeds of 50% or less and battery unit=V for speeds greater than 50%. Configuration of the battery unit 116 may be altered by operation of switches S1, S2 and S3 in accordance with the matrix shown below.

| Battery Voltage | S1* | S2* | S3* |
|---|---|---|---|
| ½ V | Closed | Open | Closed |
| V | Open | Closed | Open |

It should be understood, of course, that the foregoing relates to exemplary embodiments of the invention and that modifications may be made without departing from the spirit and scope of the invention as set forth in the following claims.

We claim:

1. An electrical system for an aircraft with an electric taxi system (ETS), the electrical system comprising:
   at least one traction motor;
   a DC link;
   at least one traction-motor bidirectional DC-AC converter interposed between the at least one traction motor and the DC link;
   an engine-driven power source configured to provide DC power to the DC link or extract DC power from the DC link;
   a battery unit configured to provide DC power to the DC link or extract DC power from the DC link; and
   an adaptive power controller interconnected with the power source, the battery unit and the at least one traction-motor bidirectional DC-AC converter and configured to regulate voltage of DC power delivered to the DC link.

2. The system of claim 1 further comprising a power-source bidirectional DC-AC converter interposed between the DC link and the engine-driven power source.

3. The system of claim 1 wherein the at least one traction-motor bidirectional DC-AC converter is configured to boost DC voltage of power extracted from the at least one traction motor to a DC voltage high enough to allow said DC power to charge cells of the battery unit.

4. The system of claim 1 configured to charge cells of the battery unit with at least a portion of power extracted from the traction motors when a state of charge (SOC) of the cells is below a predetermined maximum SOC.

5. The system of claim 4 configured to supply power from the battery unit to drive the at least one traction motor when the SOC of the cells of the battery unit is greater than a predetermined minimum SOC.

6. The system of claim 1 configured to supply emergency power from the battery unit to aircraft loads.

7. The system of claim 1 wherein the engine-driven power source includes a starter-generator of an auxiliary power unit of the aircraft.

8. The system of claim 7 wherein the system is configured to utilize extracted power from the at least one traction motor to back-drive the starter-generator.

9. The system of claim 1:
   a) configured to charge cells of the battery unit with at least a portion of power extracted from the at least one traction motor when a state of charge (SOC) of the cells is below a predetermined maximum SOC;
   b) configured to supply power from the battery unit to drive the at least one traction motor when the SOC of the cells of the battery unit is greater than a predetermined minimum SOC;
   c) configured to supply emergency power from the battery unit to aircraft loads; and
   d) configured to utilize extracted power from the at least one traction motor to back-drive a starter-generator of the engine-driven power source.

10. Battery-based power system for traction motors of an electric taxi system (ETS) of an aircraft: comprising:
   a battery unit coupled with a DC link;
   a traction-motor bidirectional DC-AC converter interposed between the DC link and a traction motor of the ETS; and
   an adaptive power controller configured to control DC power flow from the battery unit to the traction motor when the ETS is in a driving mode and to control DC power flow from the traction motor to the battery unit when the ETS is in a braking mode,
   the traction-motor bidirectional DC-AC converter being configured to regulate output voltage of DC power produced during braking mode operation of the ETS so that said output voltage is high enough to produce charging of the battery unit.

11. The power system of claim 10 wherein the battery unit comprises two sets of cells,
   wherein the two sets of cells connected in parallel provide DC voltage sufficiently high to drive the traction motor at speeds of 50% or less, and
   wherein the two sets of cells connected in series provide DC voltage sufficiently high to drive the traction motor at speeds greater than 50%.

12. The power system of claim 11 further comprising switches interconnecting the two set of cells, said switches being controlled by the adaptive power controller responsively to speed demands of the ETS to connect the sets of cells in series or in parallel.

13. The power system of claim 10:
   wherein the adaptive power controller is configured to determine state of charge (SOC) of cells of the battery unit; and wherein the adaptive power controller is configured to control flow of DC power from the traction motor to back drive an engine-driven power source of the aircraft when the SOC is at or above a predetermined maximum.

14. The power system of claim 13 wherein the engine-driven power source is a starter-generator of an auxiliary power unit of the aircraft.

15. A method for controlling power flow in an electric taxi system (ETS) of an aircraft comprising the steps of:
   determining if a traction motor is driving or braking;
   determining that state of charge (SOC) of a battery unit is above a predetermined minimum when the traction motor is driving;
   utilizing power from the battery unit to augment power from an engine-driven power source to drive the traction motor when the SOC is above the predetermined minimum;
   upon determining that SOC of the battery unit is less than a predetermined maximum when the traction motor is in a braking mode:
      converting AC power produced by the traction motor to regulated DC power having a voltage sufficiently high to charge cells of the battery unit; and
      utilizing said regulated DC power to charge said cells; and
   upon determining that SOC of the battery is equal or greater than a predetermined maximum:
      converting AC power produced by the traction motor to regulated DC power;
      converting said regulated DC power to regulated AC power; and
      utilizing said regulated AC power to augment power from an engine-driven power source to drive AC loads on the aircraft.

16. The method of claim 15 comprising the steps of:
connecting two sets of cells of the battery unit in parallel; and
utilizing DC power from the parallel connected cells to drive the traction motor during taxiing of the aircraft at speeds of 50% or less.

17. The method of claim 15 comprising the steps:
connecting two sets of cells of the battery unit in series; and
utilizing DC power from the series connected cells to drive the traction motor during taxiing of the aircraft at speeds greater than 50%.

* * * * *